US007292737B2

(12) United States Patent
Zhou et al.

(10) Patent No.: US 7,292,737 B2
(45) Date of Patent: Nov. 6, 2007

(54) UNIFIED BAYESIAN FRAMEWORK FOR SHAPE REGISTRATION

(75) Inventors: Yi Zhou, Beijing (CN); Lie Gu, Pittsburgh, PA (US); Lei Zhang, Beijing (CN); Mingjing Li, Beijing (CN); Hong-Jiang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 863 days.

(21) Appl. No.: 10/641,608

(22) Filed: Aug. 15, 2003

(65) Prior Publication Data
US 2005/0036690 A1 Feb. 17, 2005

(51) Int. Cl.
G06K 9/32 (2006.01)
G06K 9/36 (2006.01)
(52) U.S. Cl. .................................. 382/294; 382/287
(58) Field of Classification Search ........... 382/294, 382/293, 287; 345/619–689; 348/580; 708/442
See application file for complete search history.

(56) References Cited

U.S. PATENT DOCUMENTS 5,926,568 A * 7/1999 Chaney et al. .............. 382/217
6,816,632 B1 * 11/2004 Slice ........................... 382/294
2003/0058268 A1 * 3/2003 Loui et al. .................. 345/719
2003/0161500 A1 * 8/2003 Blake et al. ................ 382/103

OTHER PUBLICATIONS

Cootes et al. ("Active Shape Models—Their Training and Application" Computer vision and Image Understanding, vol. 61 No. 1, January pp. 38-59, 1995).*
Cootes, T.F.; Taylor, C.J.; Cooper, D.H.; and Graham, J.; "Active Shape Models-Their Training and Application"; Computer vision and Image Understanding; Jan. 1995; pp. 38-59; 61(1).
Cootes, T.F. and Taylor, C.J.; "Statistical Models of Appearance for medical image Analysis and Computer Vision" Proc. SPIE Medical Imaging, 2001, 14 pages.

* cited by examiner

Primary Examiner—Samir Ahmed
Assistant Examiner—Randolph Chu
(74) Attorney, Agent, or Firm—Lee & Hayes, PLLC

(57) ABSTRACT

Systems and methods for shape registration are described. In one aspect, training shape vectors are generated from images in an image database. The training shape vectors identify landmark points associated with one or more object types. A distribution of shape in the training shape vectors is represented as a prior of tangent shape in tangent shape space. The prior of tangent shape is then incorporated into a unified Bayesian framework for shape registration.

19 Claims, 10 Drawing Sheets

An Exemplary Graphical Illustration of a BTSM — 600

An Exemplary Graphical Illustration of a C-BTSM — 700

UNIFIED BAYESIAN FRAMEWORK FOR SHAPE REGISTRATION

TECHNICAL FIELD

The invention pertains to image processing.

BACKGROUND

In computer vision, an image typically includes one or more visible objects. Geometrical description of a visible object can be decomposed into two high-level ingredients: geometrical transformation and shape. Shape registration, which is also known as "shape alignment", is commonly used to estimate both underlying object shape presentation and transform coefficients. In view of this, shape registration estimations are often used to facilitate image segmentation operations such as object localization and boundary detection. Image segmentation is a common component of many different applications of image analysis.

Unfortunately, existing shape registration techniques, many of which are based on parametric shape models (e.g., active contour, deformable, active shape models), often provide inconsistent and erroneous estimations of underlying shape presentation and corresponding geometrical transforms. As a result, image analysis applications, which depend on image segmentation to facilitate image analysis operations, are substantially limited in effect and accuracy. To make matters worse, conventional shape registration techniques typically rely on complex and computationally intense numerical optimization algorithms to estimate object shape and transform coefficients. This often makes it impractical or even impossible to implement image analysis applications that utilize shape registration on computing devices with limited processing and/or memory resources.

SUMMARY

A systems and methods for shape registration via a unified probabilistic Bayesian framework are described. In one aspect, training shape vectors are generated from images in an image database. The training shape vectors identify landmark points associated with one or more object types. A distribution of shape in the training shape vectors is represented as a prior of tangent shape in tangent shape space. The prior of tangent shape is then incorporated into a probabilistic Bayesian framework for shape registration such that the prior of tangent shape is integrated with an adaptive likelihood of tangent shape in observed image space.

BRIEF DESCRIPTION OF THE DRAWINGS

The following detailed description presents systems and methods (i.e., a framework) for shape registration with reference to the accompanying figures. In the figures, the left-most digit of a component reference number identifies the particular figure in which the component first appears.

FIG. 11 shows an exemplary procedure for expectation maximization (EM) shape registration/alignment operations.

DETAILED DESCRIPTION

Overview

Figure 1:
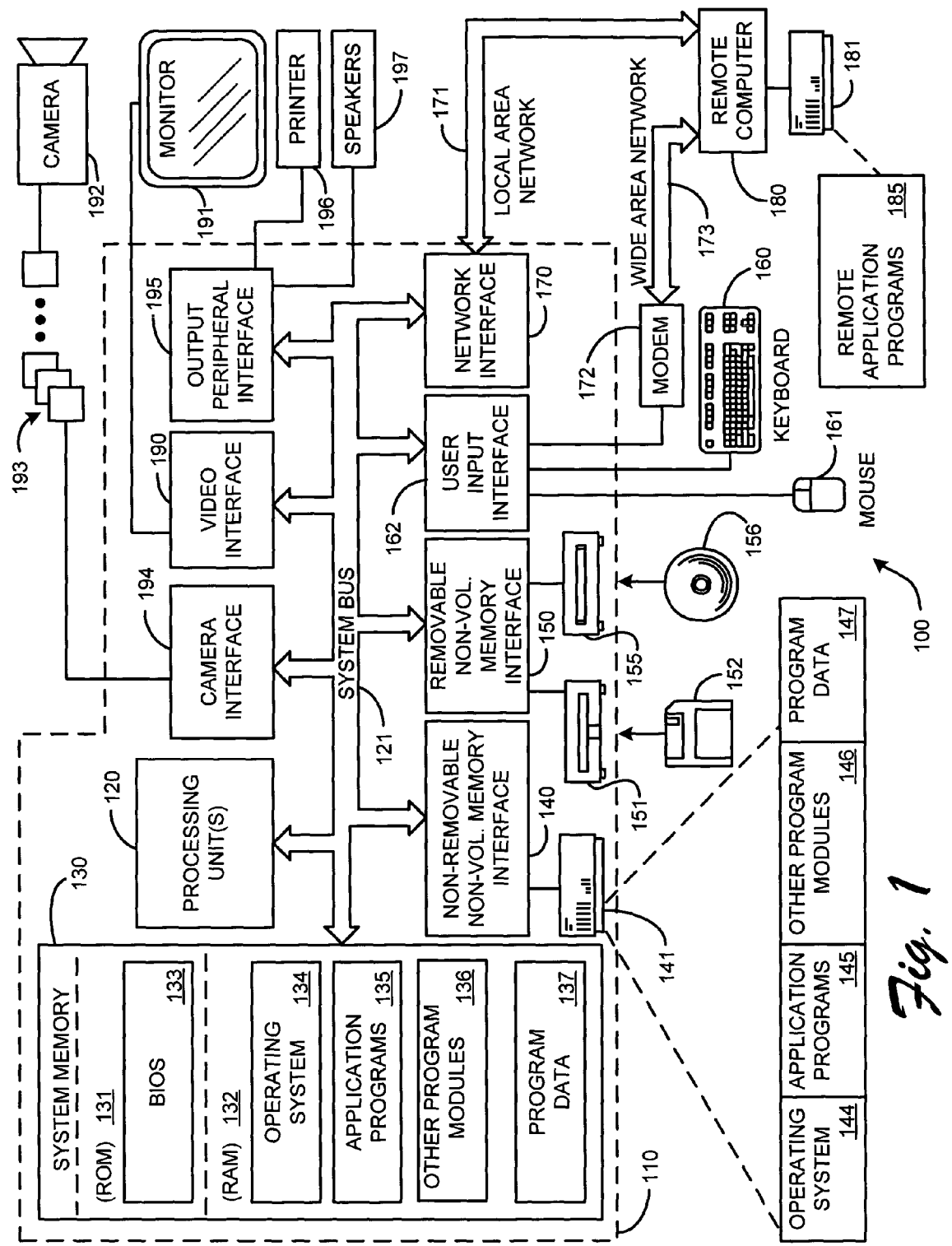
FIG. 1 is a block diagram of an exemplary computing environment within which systems and methods for a Bayesian framework for shape registration may be implemented.

Systems and methods for a unified probabilistic Bayesian framework for shape registration are described. In particular, a Bayesian Tangent Shape Model (BTSM) is used to integrate a prior of shape distribution represented in tangent shape space with an adaptive likelihood of shape observation in a observed image space. That is, the framework unifies the priors of tangent shape in tangent shape space with the likelihood of tangent shape in image space. Similarity-transform coefficients and shape parameters in BTSM are determined by maximum a-posteriori (MAP) estimation. BTSM probability formulation incorporates parameter priors and an adaptive interaction mechanism into shape registration. A constrained BTSM (C-BTSM) adds flexibility to the shape registration with additional parameter priors. As such, tangent shape vectors in a given image space represent BTSM and C-BTSM hidden states. For purposes of discussion and unless otherwise indicated, BTSM and the C-BTSM are often collectively referred to as the BTSM framework/algorithms.

The BTSM algorithms provide a weighted representation of tangent shape and continuous regulation of shape parameters derived from optimization of an explicit and continuous loss function using expectation maximization ("EM"). EM-based searching algorithms are used to learn and update tangent shape(s) and other model parameters from the BTSM framework. As a result, tangent shape estimation is represented as a weighted average of two (2) shape vectors. Tangent shape in BTSM is updated by a weighted average of a projection of observed shape onto tangent space and the reconstruction of given shape parameters, such that prior knowledge and image evidence are both encoded in the BTSM. Exemplary shape parameters include the manners that the shape intends to deform from the average, for example, thinner-to-fatter faces, open-to-closed mouths, etc. Tangent shape in C-BTSM, in addition to being updated with the weighted average of the two vectors discussed above, is updated with the projection of a constraint shape vector represented in constraint space.

In one implementation, ratio(s) of observation noise variations (non-homogenous observation noise) are multiplied to regularize shape parameters, and thereby provide for valid shape instances. Since the regularizing operations are continuous, rather than truncated, the operations provide substantially stable shape estimations.

An Exemplary Operating Environment

Turning to the drawings, wherein like reference numerals refer to like elements, the invention is illustrated as being implemented in a suitable computing environment. Although not required, the invention is described in the general context of computer-executable instructions, such as program modules, being executed by a personal computer. Program modules generally include routines, programs, objects, components, data structures, etc., that perform particular tasks or implement particular abstract data types.

FIG. 1 illustrates an example of a suitable computing environment 100 on which the subsequently described systems, apparatuses and methods for shape registration may be implemented (either fully or partially). Exemplary computing environment 100 is only one example of a suitable computing environment and is not intended to suggest any limitation as to the scope of use or functionality of systems and methods the described herein. Neither should computing environment 100 be interpreted as having any dependency or requirement relating to any one or combination of components illustrated in computing environment 100.

The methods and systems described herein are operational with numerous other general purpose or special purpose computing system environments or configurations. Examples of well known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework for shape registration may also be implemented in clients of limited resources, such as handheld computers, or other computing devices. The invention may also be practiced in distributed computing environments where tasks are performed by remote processing devices that are linked through a communications network. In a distributed computing environment, program modules may be located in both local and remote memory storage devices.

With reference to FIG. 1, an exemplary system 100 for shape registration includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

System memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134 to provide a runtime environment, one or more application programs 135 for shape registration and image analysis based on shape registration, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that they are at least different copies.

A user may enter commands and information into the computer 110 through input devices such as a keyboard 160 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 162 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

A camera 192 (such as a digital/electronic still or video camera, or film/photographic scanner) capable of capturing a sequence of images 193 may also be included as an input device to the computing device 110. Further, while just one camera is depicted, multiple cameras could be included as input devices to the computing device 110. The images 193 from the one or more cameras 192 are input into the computer 110 via an appropriate camera interface 194. This interface 194 is connected to the system bus 121, thereby allowing the images to be routed to and stored in the RAM 132, or one of the other data storage devices associated with the computer 110. However, it is noted that image data can be input into the computer 110 from peripheral devices different than a camera 192, for example via any of the aforementioned computer-readable media.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. The network connections shown are exemplary and other means of establishing a communications link between the computers may be used.

Exemplary Application Programs and Data for Shape Registration

Figure 2:
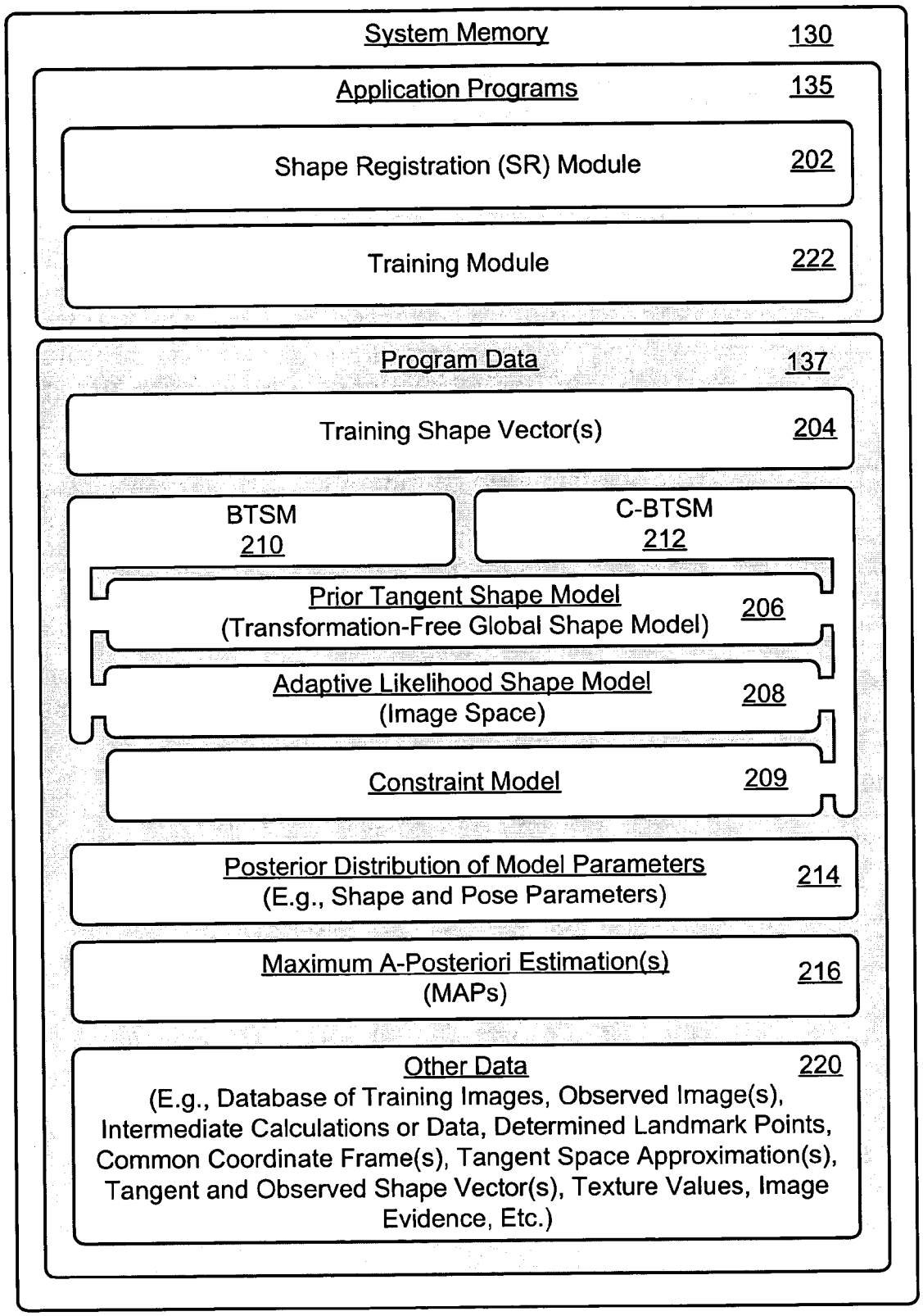
FIG. 2 shows further exemplary aspects of application programs and program data of FIG. 1 for shape registration.

FIG. 2 shows further aspects of system memory 130 of FIG. 1. In this implementation, FIG. 2 shows that application programs 135 portion of the system memory 130 includes, for example, shape registration ("SR") module 202, which provides a unified probabilistic Bayesian framework for shape registration. The SR module 202 further incorporates expectation maximization (EM) algorithms to generate one or more maximum a-posteriori (MAPs) of shape and pose parameters, according to the posterior distribution function derived from Prior Tangent Shape Model, Adaptive Likelihood Shape Model, and a Constraint Model (for a constrained Bayesian Tangent Shape Model only).

To these ends, the SR module 202 describes distribution of shape in a set of training shape vectors 204 with a prior tangent shape model 206. The prior tangent shape model 206 is generated in tangent space. Tangent space provides a linear approximation of general shape space near a mean shape vector. In observed image space, the SR module 202 generates an Adaptive Likelihood Shape Model 208 of the tangent shape in observed image space. This incorporates image evidence (image parameters) into the Bayesian framework of system 100 (FIG. 1). For purposes of discussion, an observed image is represented with a respective portion of "other data" 220.

The shape registration module 202 models tangent shape likelihoods 208 in image space with respect to the likelihood model 208 in Bayesian Tangent Shape Model (BTSM) 210. The SR module 202 adds additional constraining prior(s) in constraint space via the Constraint Model 209 to the Constrained BTSM (C-BTSM) 212. Data relationships with respect to the BTSM 210 and the C-BTSM are illustrated in FIG. 2. For instance, the BTSM 210 is shown as incorporating respective portions of Prior Tangent Shape Model Data 206 and Adaptive Likelihood Shape Model 208. The C-BTSM 212 is shown as incorporating respective portions of Prior Tangent Shape Model Data 206, Adaptive Likelihood Shape Model 208, and the Constraint Model 209. These data relationships sets-up a preliminary relationship between object geometrical transformation and shape, such that automatic techniques such as manual interpolation, eye and/or mouth detection, etc., can be adopted to facilitate shape registration. Such an exemplary relationship is described below in the section titled "The Constraint Model", and in reference to FIG. 11, which shows an exemplary procedure for expectation maximization shape registration/alignment operations.

At this point, the SR module 202 calculates a posterior distribution of model parameters 214 from the prior tangent shape model 206 and the likelihood shape models 208; such model parameters include shape and pose parameters. Exemplary pose parameters include, for example, translation, scale and rotation. The EM portion of the SR module 202 learns model parameters from the posterior distribution of model parameters 214 via updating tangent shape (i.e., the EM updates tangent shape from the shape vectors of various shape spaces unified by the Bayesian framework). In this manner, and in view of an observed image, the SR module 202 provides maximum a-posteriori (MAP) 216 of one or more matches of image evidence to priors in tangent shape space.

In this implementation, training module 222 is used to manually or programmatically generate training shape vectors 204 from a database of training images Such a database of images is represented by respective portions of "other data" 220. The training images represent various objects, object variations, and/or object illuminations. In one implementation, the image database is a Face Recognition Technology (FERET) or other image database comprising facial features. For instance, the training module 222 trains a class of objects with specific structure such as faces. Training shape vectors 204 indicate object shape landmark points.

Figure 3:
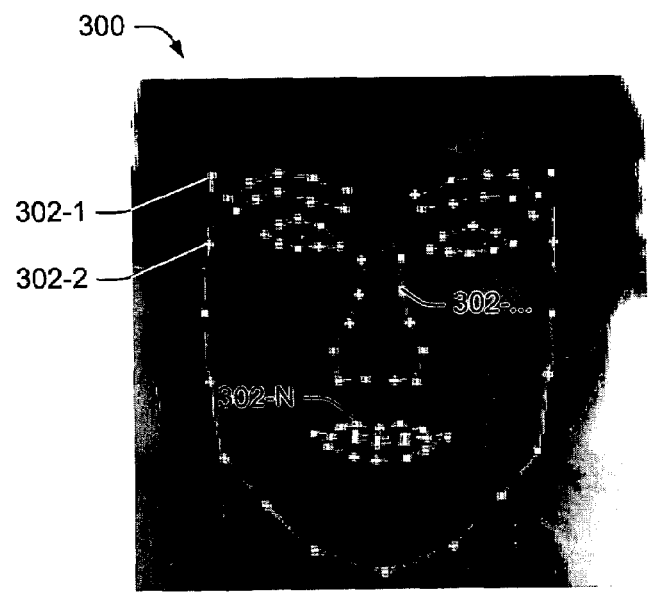
FIG. 3 shows an image, which in this example, is a face labeled with exemplary landmark points to indicate underlying shape.

FIG. 3 shows an image 300, which in this example, is a face labeled with exemplary landmark points 302-1 through 302-N to indicate underlying shape. Although each landmark point 302 in this exemplary image is not explicitly identified with a particular reference number, each exemplary landmark point is represented with a respective a white dot.

The Prior Tangent Shape Model 206

Assuming that a planar shape is described by some number of N landmark points (e.g., landmark points 302 of FIG. 3) in an image, it is represented with a 2N-dimensional vector $s_i$. Given a set of training shape vectors $\{s_i\}_{i=1}^{L}$ 204, the Training Module 222 aligns the training shape vectors into a common coordinate frame, for instance, using standard Generalized Procrustes Analysis (GPA) techniques. The procedure essentially equals to minimize a quadratic loss function defined by $$L(\mu) = \sum_{all\ i} \|T_i(s_i) - \mu\|^2,$$

wherein L represents the loss function, $\mu$ represents the mean shape vector, and wherein $T_i(s_i)$ is a two (2) dimensional similarity transform of $s_i$.

Tangent shape space is a linear approximation of the general shape space near a mean shape vector. More specifically, tangent shape space ("tangent space") $C_\mu$ is defined as the space normal to $T(\mu)$ and passing through $\mu$. Training shape vectors $s_i$ 204 are transformed onto $C_\mu$ by aligning $s_i$ with $\mu$ as $\{x_i \in C_\mu : x_i = T_i(s_i)\}_{i=1}^{L}$. $x_i$ is the "tangent shape vector", which is represented as a 2N-dimensional vector. The residuals are computed as $\{t_i = x_i - \mu\}_{i=1}^{L}$ in tangent space instead of image space, to remove the difference introduced by similarity transform $T_i$.

Note that the dimension of $C_\mu$ is 2N-4, where the degenerated dimensionality is corresponding to the degree of freedom of similarity transformation in a 2d Euclidean space. Furthermore, since any transformed shape vector from $\mu$ can be represented by a linear combination of $\{e, e^*, \mu, \mu^*\}$, the complement space of $C_\mu$ is spanned by $\{e, e^*, \mu, \mu^*\}$. ($e = (1,0,1,0,\ldots,1,0)^T$; $x^*$ is obtained by rotating planar shape $x$ by 90°, i.e. $x = (x_1, x_2 \ldots x_{2N})^T \Rightarrow x^* = (-x_2, x_1, \ldots, -x_{2N}, x_{2N-1})^T$). Therefore, the covariance matrix of tangent shape, $$\text{Var}(X) = \frac{1}{L-1} \sum_{i=1}^{L} (x_i - \mu)(x_i - \mu)^T \quad (1)$$

has at least four zero eigenvalues with corresponding eigenvectors $\{e, e^*, \mu, \mu^*\}$. In other words, tangent shape variances in this complement space are zero. A probabilistic extension of Principle Component Analysis (PCA) to model tangent shape variation allows the model to be written as follows:

$$\Phi^T(x - \mu) = \begin{pmatrix} I_r \\ 0_{(2N-4-r) \times r} \end{pmatrix} b + \varepsilon, \text{ wherein}$$

(a) $\Phi^T$:(2N-4)×2N is the tangent projection matrix whose row vectors are the eigenvectors of Var (X). $\Phi_r$:2N×r includes the first r columns of $\Phi$.

(b) b, the shape parameter, is a r-dimensional vector distributed as multivariate Gaussian N(0, $\Lambda$), where $\Lambda$=diag($\lambda_1$, ..., $\lambda_r$). $\lambda_i$ is the ith eigenvalue and r is the number of modes to retain in the eigen-model.

(c) $\varepsilon$ denotes an isotropic noise in the tangent space. It is a 2N-4-dimensional random vector, which is independent with b and distributes as $$p(\varepsilon) \sim \exp\{-\|\varepsilon\|^2/(2\sigma^2)\} \quad (\sigma^2 = \frac{1}{2N-4} \sum_{i=r+1}^{2N-4} \lambda_i).$$

In view of the above, the prior tangent shape model 206 is then derived as follows:

$$x = \mu + \Phi_r b + \Phi \varepsilon \quad (2),$$

wherein $\mu$, $\Phi$, $\Phi_r$ and $\varepsilon$ are all the same symbols as above.

By adding an isotropic Gaussian noise term, PCA is associated with a probabilistic explanation, thereby allowing computation of the posterior of model parameters 214. In (b), each item reflects a specific variation along the corresponding principle component (PC) axis. Instead of using all modes/principle components and 2N-4-dimensional shape parameters, only a subset of them is selected to reconstruct the shape with shape variations of interest. The fewer the modes selected for use, the more compact the model, and the smoother the reconstructed shape tends to be. On the other hand, as the number of modes involved in describing shape increases, the model's flexibility also increases.

Figure 4:
FIG. 4 shows an exemplary set of landmark points for facial features, wherein each row illustrates a respective mode of shape variation

FIG. 4 shows an exemplary set of landmark points for facial features, wherein each row illustrates a respective mode of shape variation. In particular, FIG. 4 illustrates exemplary shape variation along a first set of three PCs. One interpretation of the PCs is that the first PC (row 1) describes variations in vertical direction, the second PC (row 2) represents mouth variation, and the third PC (row 3) accounts for out-of-plane rotation. Tangent space noise $\varepsilon$ may be viewed as a compensation of missed shape variation during PCA projection. When the number of modes is larger, more variation is retained in PCA model and the noise variance $\sigma^2$ is smaller.

The Adaptive Likelihood Shape Model 208

Figure 5:
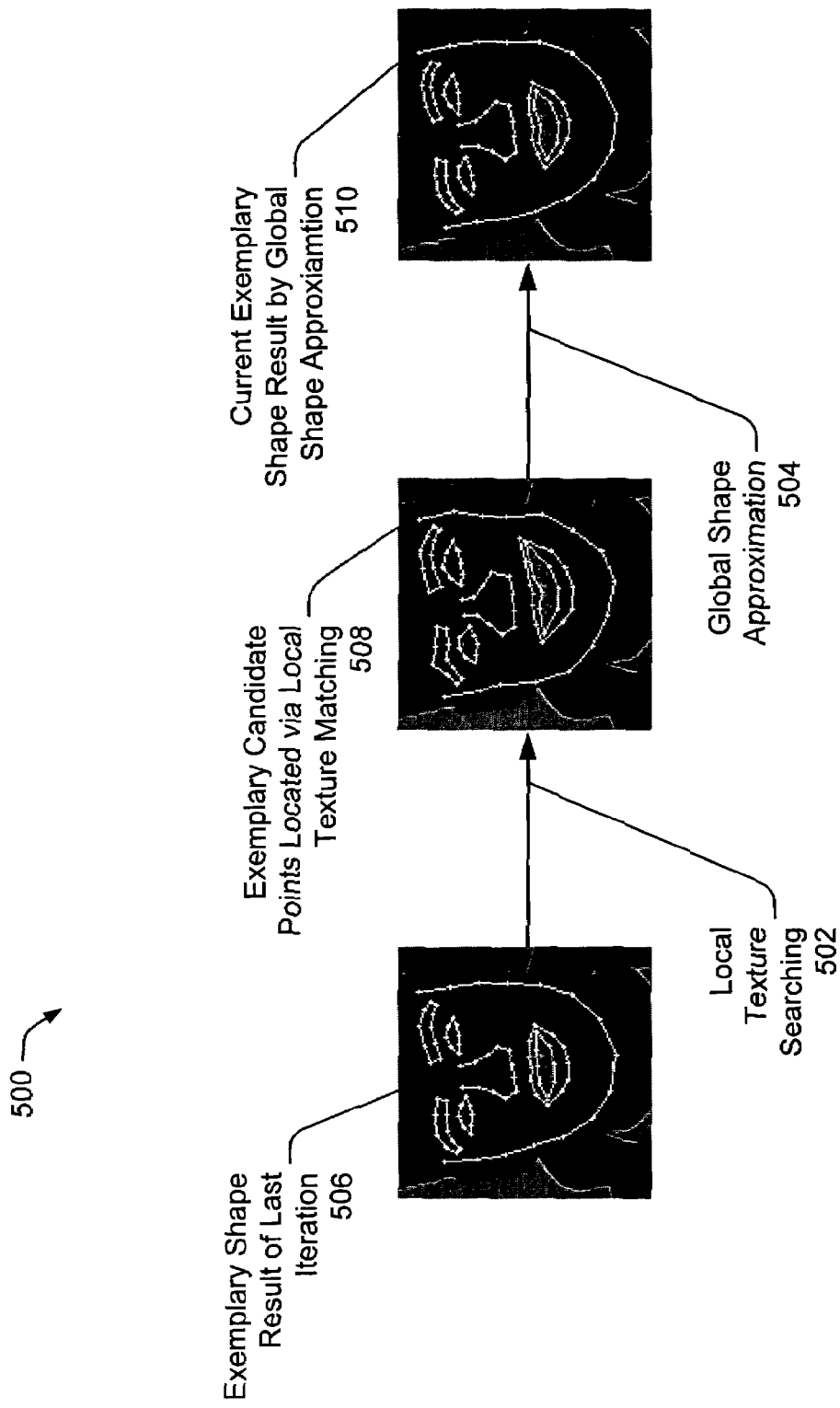
FIG. 5 illustrates an exemplary iteration of the Bayesian Tangent Shape Model (BTSM) including local texture searching and global shape approximation to refine the registration result of the last iteration.

The SR module 202 builds an adaptive likelihood shape model 208 according to observed image evidence such as local image texture. Local image texture is the grey-level derivative along the profile normal to shape boundary at each landmark point. FIG. 5 illustrates an exemplary iteration of the BTSM 210 including local texture searching 502 and global shape approximation 504 to refine the maximum a-posteriori (MAP) estimates 216 of model parameters. For instance, referring to the example of FIG. 5, the SR module 202 performs local texture searching operations 502 on last iteration results 506 to identify candidate landmark points 508. The SR module 202 then performs global shape approximation operations 504 on the candidate landmark points to arrive at the next iteration result 510.

To incorporate image evidence into the Bayesian framework of the SR module 202, a likelihood of $P(I|x,\theta)$, which may be a probability distribution of the grey levels conditional on the underlying shape, is considered. However, since I and X are not in the same physical coordinate system, the parametric form of $P(I|x,\theta)$ may be complex and non-linear. In view of this, in the BTSM 210, likelihood is redefined as $P(y|x,\theta)$.

For instance, assume $y^{old}$ is a shape estimated in a last BTSM 210 iteration. By updating each landmarks of $y^{old}$ with its local texture, y the "observed shape vector" is obtained. The distance between observed shape y and the true shape can be model as an "adaptive" Gaussian, as shown below in equation (3). In this example, adaptive indicates that the covariance of $\eta$ is updated according to the shape difference between local searching and global approximation in each iteration step. In other words, the variance of the BTSM 210 is determined by the distance between y and $y^{old}$ in each iteration step.

$$y = sU_\theta x + c + \eta \quad (3).$$

Referring to equation (3), $(s,c,\theta)$ are transformation coefficients—s being the scale parameter;

$$U_\theta = I_N \otimes \begin{pmatrix} \cos\theta & -\sin\theta \\ \sin\theta & \cos\theta \end{pmatrix}$$

is the rotation matrix; and, $$c = 1_N \otimes \begin{pmatrix} c_1 \\ c_2 \end{pmatrix}$$

is the translation parameter. The parameter $\eta$ is isotropic observation noise in the image space; $\eta$ is assumed Gaussian $N(0, \rho^2 I_{2N})$. $\rho$ is set by $$\rho^2 = \alpha \|y^{old} - y\|^2,$$

where $\alpha$ is a manually chosen constant and set to one (1) in this particular implementation.

The Constraint Model

The probability formulation of the BTSM 210 can incorporate parameter priors and user interaction mechanism into shape registration. A constraint model 209, as shown in C-BTSM 212, is used to formulate this purpose into the model building and fitting processes. Specifically, distribution of some feature points $\{u_i^c, v_i^c\}_{i=1}^M$ about an object is assumed as known beforehand. In one implementation, such beforehand knowledge is prior knowledge obtained from face detector, eye-detector, mouth-detector, user interaction, and/or information gained other types of image analysis tools.

The SR module 202 denotes the vector $z = (u_1^c, v_1^c, \ldots, u_m^c, v_m^c)^T$ as the "constraint shape vector" in the constraint model. For purposes of discussion, such a constraint vector is represented as one or more respective portions of "other data" 220 of FIG. 2. The relationship between the tangent shape x and pose parameters $p(x,c,s,\theta|z)$ is probabilistically set up as the C-BTSM 212, which is represented as follows in equation (4).

$$T_\theta(Q^T x) = Q^T(c + sU_\theta x) = z + \zeta \quad (4).$$

In equation 4, Q is a 2N×2m matrix associated to the constraint vector. For instance, if the location of the ith point is known, two columns of Q are represented as $$\left(0, \ldots, 0, \underset{2i}{1}, 0, \ldots 0\right)^T \text{ and } \left(0, \ldots, 0, \underset{2i+1}{1}, 0, \ldots 0\right)^T.$$

Whereas, if the location of the center of the first k points are known, the two columns of Q are respectively described as $$\left(1/k, 0, 1/k, 0, \ldots, \underset{2k}{1/k}, 0, 0, \ldots\right)^T$$

and $$\left(0, 1/k, 0, 1/k, \ldots, 0, \underset{2k+1}{1/k}, 0, 0, \ldots\right)^T.$$

Pose parameters $c, s, U_\theta$ are the same as in equation (4). $\zeta$ is the estimation error in image space with Gaussian distribution $N(0, \delta^2 I_{2m})$. The variance $\delta^2$ is chosen proportionally to the confidence of z.

The Posterior Distribution of Model Parameters 214

Figure 6:
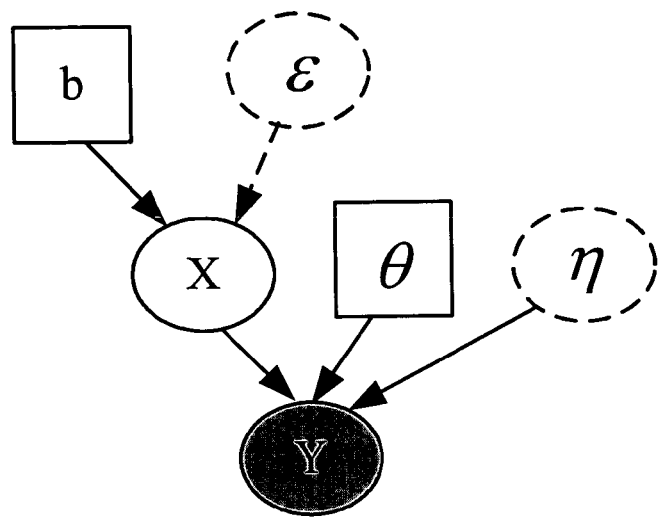
FIG. 6 shows an exemplary graphical illustration of probability formulation using BTSM.
Figure 7:
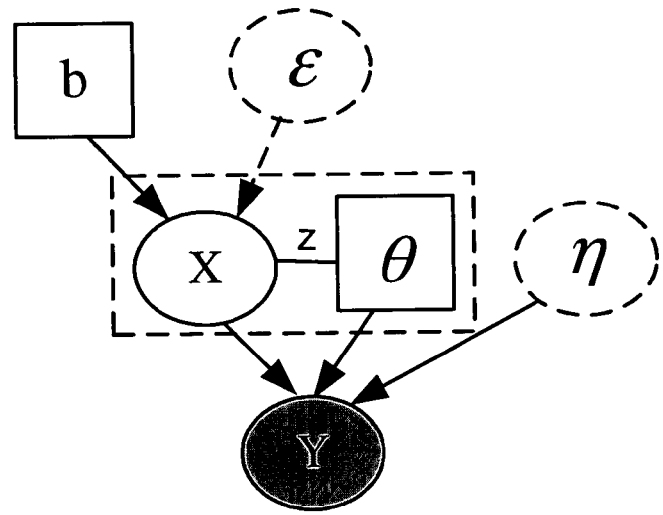
FIG. 7 shows an exemplary graphical illustration of probability formulation using constrained BTSM (C-BTSM).

FIGS. 6 and 7 show exemplary graphical models for calculating a posterior probability 214 for distribution of model parameters. The SR module 202 derives a posterior distribution of model parameters 214, which is a posterior probability of the models $(b,s,c,\theta)$. In particular, FIG. 6 shows an exemplary graphical illustration of probability formulation using BTSM 210. FIG. 7 shows an exemplary graphical illustration of probability formulation using C-BTSM 212. In these figures, circles represent variables, dashed circles denote noise terms and rectangles denote model parameters. The symbols of FIGS. 6 and 7 are as follows: "b" represents shape parameters; "□" symbolizes the pose parameters; "X" represents tangent shape; "Y" symbolizes observed shape; and, "z" represents the constrained shape vector. In the graphical models of FIGS. 6 and 7, x is treated as a missing variable, $b \sim N(0, \Lambda)$ and $(c,s,\theta)$ are model parameters, and y is an observed shape vector.

Given the observed shape vector y the posterior of model parameters $(b,s,c,\theta)$ 214 is determined by applying Bayes rule. Directly optimizing the posterior with an unknown tangent shape x may be computationally intensive. However, if the tangent shape x is known, the posterior of model parameters conditional on both x and y are much simpler. As such, an EM-based parameters estimation algorithm is implemented by the SR module 202. Equation (5) is the parameter posterior derived in BTSM.

$$p(b, c, s, \theta \mid y) \qquad (5)$$

$$\propto \exp\left\{-\frac{1}{2}\left[(\sigma^2 + s^{-2}\rho^2)^{-1}\left((\|\Phi_r^T T_\theta^{-1}(y) - b\|^2 + \|\Phi_{-r}^T T_\theta^{-1}(y)\|^2\right) + s^2\rho^{-2}\|A^T T_\theta^{-1}(y)\|^2 + b^T \Lambda^{-1} b\right]\right\} \cdot \frac{const}{(\sigma^2 + s^{-2}\rho^2)^{(N-2)}s^{-4}\rho^4},$$

wherein const does not vary with (b,c,s,θ), and $\Phi_{-r}$ is a sub-matrix of Φ created by removing the first r columns. The derivation of equation 5 is shown in further detail in Appendix A.

Parameter Estimation Via EM Algorithms

In this implementation, the SR module 202 uses the EM algorithm to compute the maximum a-posterior (MAP) 216 of the unified probabilistic shape models. In another implementation, the SR module 202 generates the MAPs 216. Before discussing the details of such derivation, we first compare EM parameter estimation with those of ASM.

Figure 8:
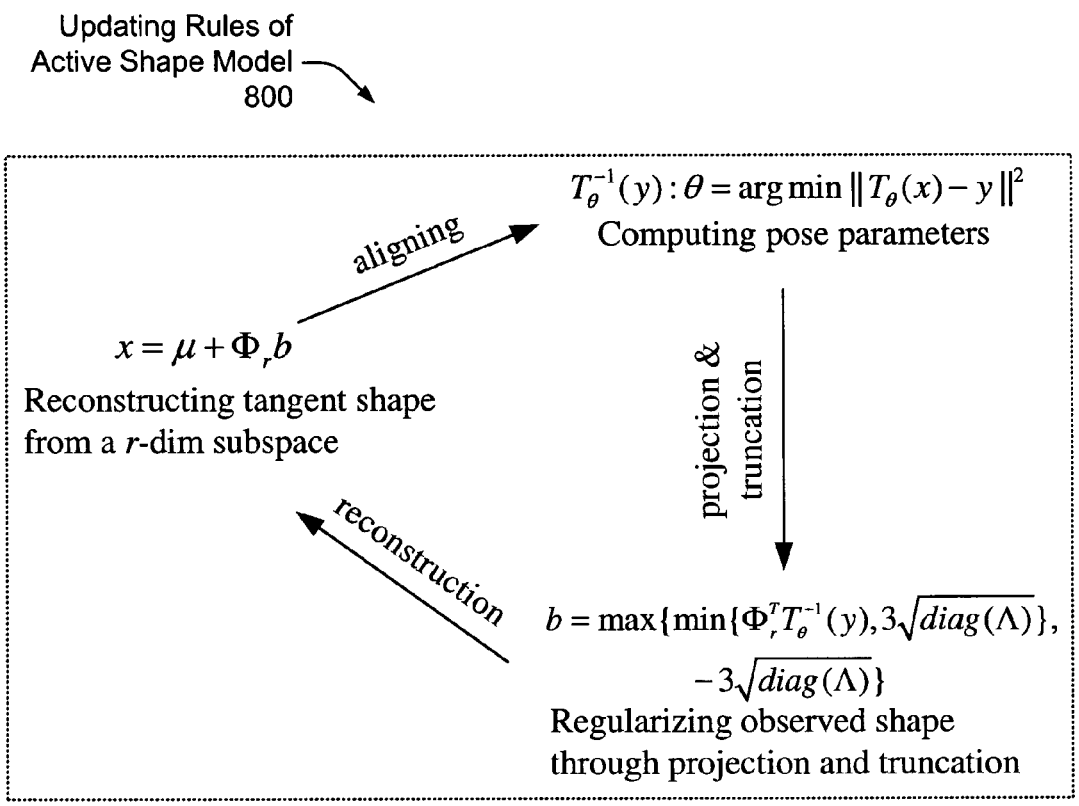
FIG. 8 shows known iterative updating operations of Active Shape Model (ASM).

FIG. 8 shows exemplary iterative updating procedure of ASM. In ASM, tangent shape x is directly constructed from shape parameter b, where b is a truncation of $T_\theta^{-1}(y)$'s coordinates within the range of $(-3\sqrt{\text{diag}(\Lambda)}, 3\sqrt{\text{diag}(\Lambda)})$.

Figure 9:
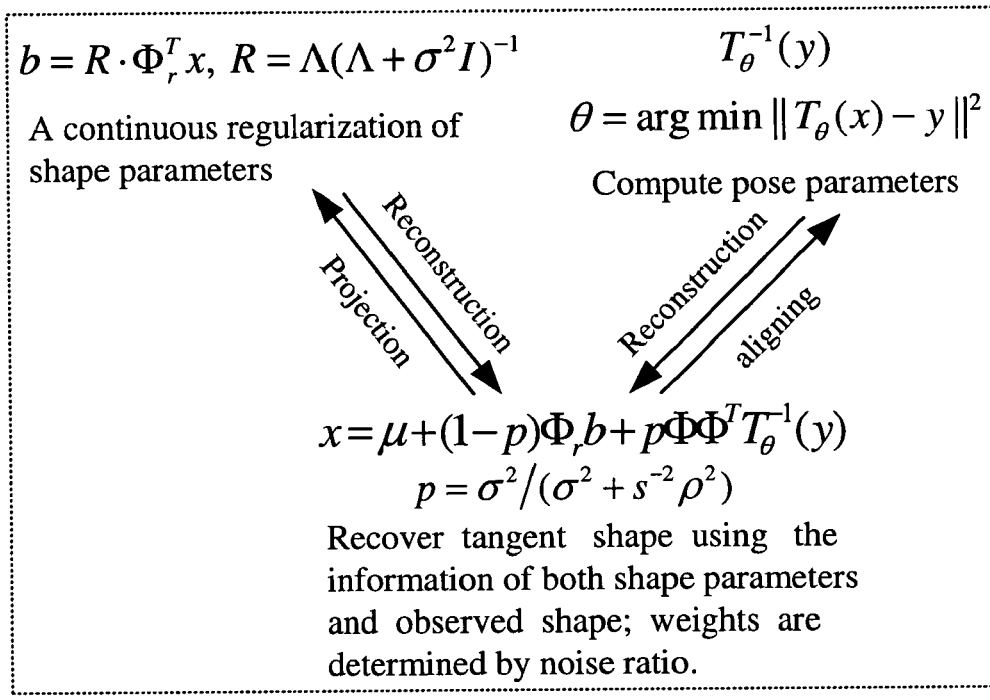
FIG. 9 shows exemplary iterative updating procedure of the BTSM for shape registration.

FIG. 9 shows exemplary iterative updating procedure of BTSM 210-216. The BTSM derives updating equations of x and b as shown and as discussed above. (E.g., Tangent shape x is estimated by a weighted sum of the shape reconstructed from shape parameters b and the transform of the observed shape y to the tangent space). Note the differences between ASM and BTSM 210-216 updating rules of the tangent shape x and shape parameter b.

BTSM 210 updates tangent shape x with a weighted average of the shape reconstructed from the shape parameter b and the tangent projection of the observed shape y. In this way, the estimation of x encodes both prior shape knowledge and image evidence. Weight p is automatically chosen by computing the ratio between the variance σ of prior noise in tangent space and the variance ρ of the observation noise. They are aligned to the same scale by multiplying the scale factor s of similarity transform. When ρ is large, which implies the image is noisy or the observation is not stable. In this scenario, shape parameters are more important for updating x. On the other hand, when ρ is small, shape estimation may already be converged, and thus, not heavily regularized.

Additionally, BTSM regularization on shape parameters provides for valid shape instances. Using a continuous regularization function is used rather than a truncation function because numerically, discontinuous regularization on b may result in an unstable estimation. That is, the result may shift back and forth instead of converging to a point. In BTSM, the shape parameter is constrained by multiplying a constrained factor $R=\Lambda(\Lambda+\sigma^2 I)^{-1}$. Remember that Λ represents prior shape variance matrix and $\sigma^2$ represents the residual variance. (See Section 9.2 for details). Specifically, along the ith principle axis, $b_i$ is updated by $b_i = \lambda_i/(\lambda_i+\sigma^2)$ $(\Phi_{\cdot i}^T x)$, where $\Phi_{\cdot i}$ is the ith column of Φ.

Accordingly, the BTSM 210 algorithm enjoys its merits in two aspects: weighted representation of tangent shape and continuous regularization of shape parameters. These results are derived from optimizing an explicit and continuous loss function using EM.

BTSM Expectation Maximization Operations

For BTSM 210, the E-step takes into consideration the expectation of two statistics x and $\|x\|^2$ such that Set $$\langle x \rangle = E(x \mid b, c, s, \theta, y) \text{ and } \langle \|x\|^2 \rangle = E(\|x\|^2 \mid b, c, s, \theta, y).$$

For BTSM 210, the M-step maximizes the posterior 214 based on the expectation of x and $\|x\|^2$. That is, the M-step includes computation of a maximum a posteriori (MAP) of the shape parameter b and compute the maximum likelihood estimation (MLE) of the transformation parameter (c,s,θ).

C-BTSM Expectation Maximization Operations

For C-BTSM 212, and in contrast to the EM algorithm for BTSM, the E-step is calculated as follows:

$$[E\text{-Step}]: \text{Set } \langle x \rangle = E(x \mid b, c, s, \theta, y), \langle \|x\|^2 \rangle = E(\|x\|^2 \mid b, c, s, \theta, y),$$

and $$\langle \|Q^T x\|^2 \rangle = E(\|Q^T x\|^2 \mid b, c, s, \theta, y).$$

Non-Homogenous Observation Noise

As discussed above, observation noise can be distributed as an isotropic Gaussian. However, this assumption may not always hold, because the noise of each feature landmark may be different due to partial occlusion, noisy background or other effects in the image. To address this, the SR module 202 utilizes a diagonal variance matrix instead for the observation noise η as, $$\eta \sim N(0, \Sigma), \Sigma = \text{diag}(\rho_1^2, \ldots, \rho_N^2) \otimes I_2 \qquad (6),$$

wherein, $$\rho_i^2 = c\left((y_{2i-1}^{old} - y_{2i-1})^2 + (y_{2i}^{old} - y_{2i})^2\right).$$

The EM algorithm can also be applied to this case with slight modification. Instead of computing <x> and <$x^2$>, the statistics we need to compute in the E-Step is <x> and <$x^T \Sigma^{-1} x$>. Exemplary results of EM parameters estimation are given in the appendix C.

Exemplary Procedure for Shape Registration

Figure 10:
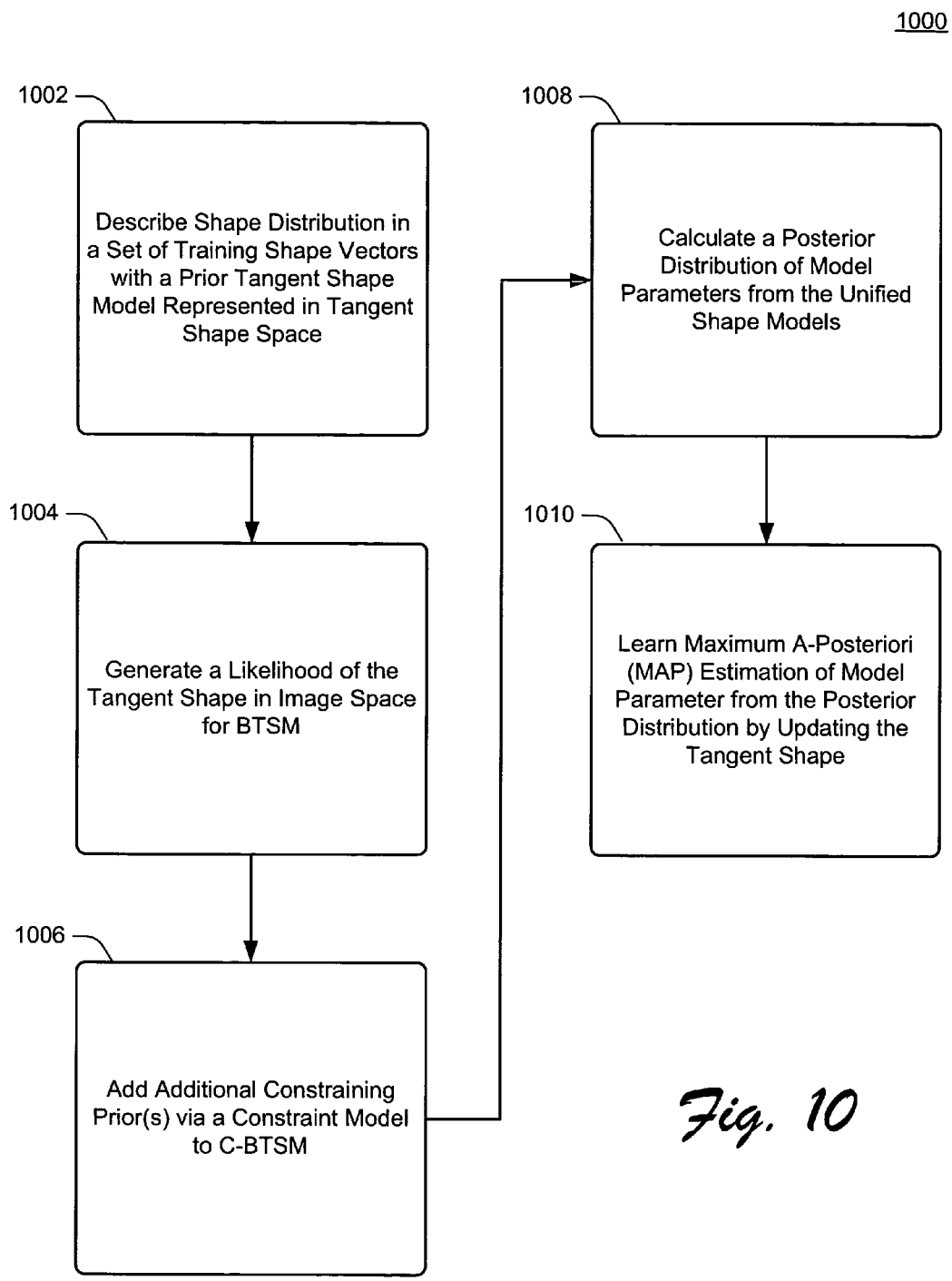
FIG. 10 shows an exemplary procedure for a unified probabilistic Bayesian framework for shape registration.

FIG. 10 shows an exemplary procedure for shape registration. The operations 1002 through 1010 of the procedure are performed by one or more computer program applications 135 of FIGS. 1 and 2 such as the SR module 202 of FIG. 2. For purposes of discussion, the operations of FIG. 10 are described in reference to the features of FIG. 2, unless otherwise indicated. In particular, at block 1002, the SR module 202 describes distribution of shape in a set of training shape vectors 204 with a prior tangent shape model 206. The prior tangent shape model 206 is generated in tangent space. Tangent space provides a linear approximation of general shape space near a mean shape vector. In view of an observed image, and to incorporate image evidence into the Bayesian framework, at block 1004, the SR module 202 generates a likelihood model 208 of the tangent shape in image space to BTSM 210. At block 1006, the SR module 202 adds additional constraining prior(s) via the constraint model 209 to C-BTSM 212. At block 1008, the SR module 202 calculates a posterior distribution of model parameters 214 from the unified shape models, including prior tangent shape model 206 and likelihood shape model 208 in BTSM, and constraint model 209 in addition in C-BTSM. At block 1010, the EM portion of the SR module 202 learns maximum a-posteriori (MAP) 216 from the posterior distribution of model parameters 214 by updating the tangent shape (i.e., the EM updates tangent shape from the shape vectors of various shape spaces unified by the Bayesian framework). The operations of block 1010 are described in detail with respect to FIG. 11.

Figure 11:
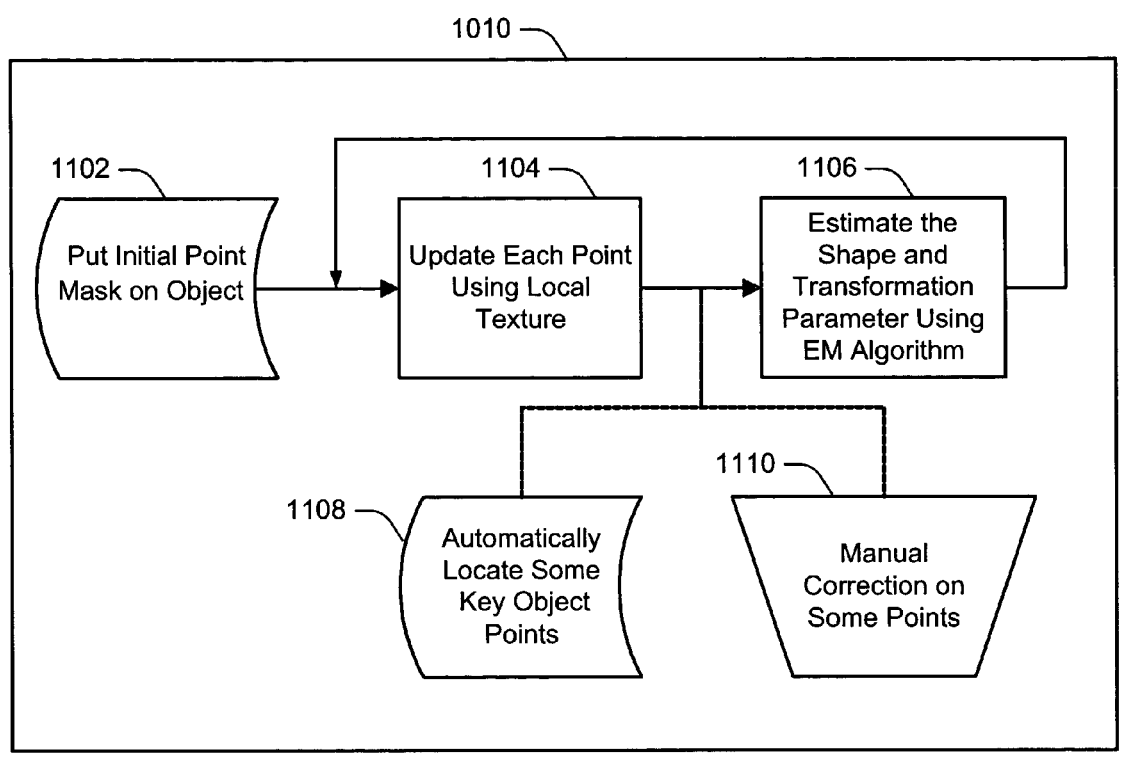
FIG. 11 shows further aspects of the exemplary procedure of FIG. 10. In particular.

FIG. 11 shows an exemplary procedure for expectation maximization (EM) shape registration/alignment operations. The operations 1002 through 1010 of the procedure are performed by one or more computer program applications 135 of FIGS. 1 and 2 such as the SR module 202 of FIG. 2. For purposes of discussion, the operations of FIG. 10 are described in reference to the features of FIG. 2, unless otherwise indicated. At block 1102, the SR module 202 puts an initial point mask (e.g., set of landmark points) on an observed object in an image. In one implementation, the object is a face and the SR module 202 is implemented for automatic face detection. For purposes of discussion, such initial points are represented with respective portions of "other data" 220 of FIG. 2.

At block 1104, each point is updated using local texture values (observed from the observed image). At block 1106, MAP(s) 216 are identified via the EM algorithm. At block 1108, information identifying key object (e.g., facial) landmark points are optionally automatically determined by one or more tools such as eye detector, mouth detector, and/or other applications. As illustrated, this information is communicated to the SR module 202 to increase the accuracy of the shape registration algorithms. Additionally, as shown by block 1110, manual interpolation of object landmark points can also be input into the described framework to enhance the shape registration framework.

Alternate Implementations

Figure 12:
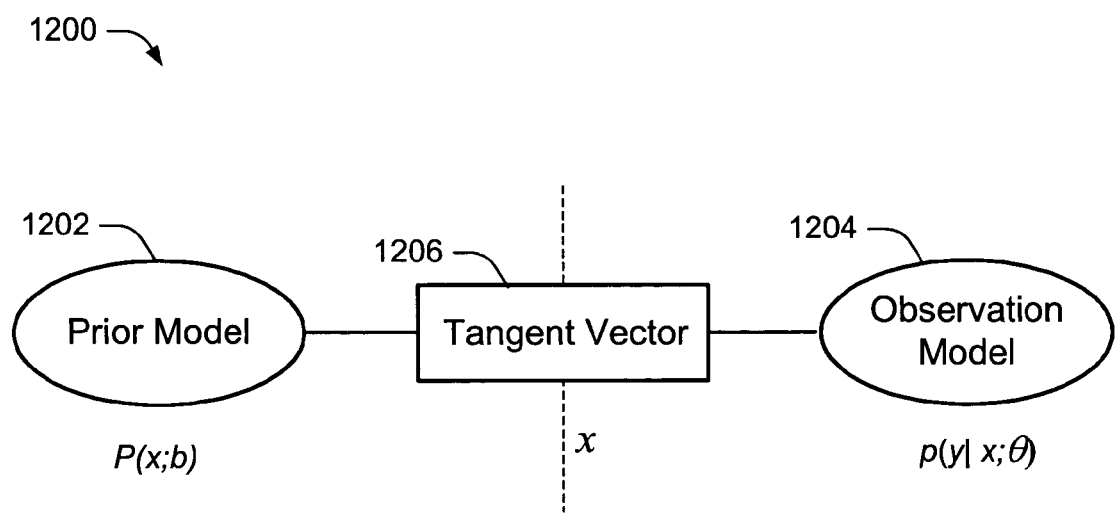
FIG. 12 shows an exemplary general model for a unified probabilistic Bayesian framework for shape registration.

The BTSM framework of FIG. 2 can be extended to a more general form illustrated by the undirected graph of FIG. 12. As shown, the prior model 1202 describes shape variation, the observation model 1204 incorporates image evidence and they are connected through the tangent shape 1206. While the tangent shape is estimated, due to its local Markov property, the MAP estimation of pose parameters depends on the right side of the graph, and it is degenerated to standard PCA with the assumption that the observation noise is an isotropic Gaussian. Note that the equation (18) of Appendix C equals to estimate pose parameters using weighted Procrustes analysis. Similarly, the MAP estimation of shape parameters is determined by the left part of the graph given the tangent shape.

FIG. 12 provides a general framework for the described shape registration problem. In contrast to directly optimizing a huge, heuristically defined loss function, the statistical treatment of BTSM 210 and 212 provides flexibility to deal with different problems in different sub-models. For example, if we are interested in modeling multimodal shape variations like exaggerated face expression, we may parameterize the left part as a Gaussian mixtures. Whereas, if we are interested in handling partial occlusion or image noise, the right part of the framework can be implemented using robust statistics methods. (Approximate inference algorithm can be adopted in either case).

Conclusion

The described systems and methods for shape registration have been described in language specific to structural features and methodological operations. However, the subject matter as defined in the appended claims is not necessarily limited to the specific features or operations described. For instance, although the BTSM models (i.e., BTSM and C-BTSM) have been used for shape registration in an automatic face recognition system, the BTSM models could also have been utilized for shape registration in different automatic and/or manual interpolation systems for image analysis (i.e., for shape registration that locates objects other than facial features). Accordingly, the specific features and operations of the described systems and methods were provided as exemplary forms of implementing the claimed subject matter.

Appendix A

Posterior Distribution of Parameters

By combining equation (2) with (3) and multiplying $\Phi_r^T$ on both sides of the equation we have, $$T_\theta^{-1}(y) = \mu + \Phi_r b + \Phi \varepsilon + s^{-1} U_\theta^{-1} \eta \quad \left(\xi \triangleq s^{-1} U_\theta^{-1} \eta\right) \quad (8)$$
$$= \mu + \Phi_r b + \Phi(\varepsilon + \Phi^T \xi) + AA^T \xi$$
$$\Rightarrow \Phi_r^T T_\theta^{-1}(y) - b = (I_r, 0_{r \times (2N-4-r)})(\varepsilon + \Phi^T \xi),$$

where $A=(e,e^*,\mu,\mu^*)$. Since $\epsilon$ and $\xi$ are independent, the distributions of $\epsilon+\Phi^T\xi$ and $A^T\xi$ can be computed as, $$(\epsilon+\Phi^T\xi) \sim N(0, (\sigma^2+s^{-2}\rho^2)I_{2N-4}) A^T\xi \sim N(0, s^{-2}\rho^2 I_4) \quad (9).$$

Combining (8) and (9) we obtain the likelihood of model parameters. The posterior of model parameters is computed by applying the Bayes rule as (5).

Appendix B

Detailed Derivation of the Expectation Step

The conditional probability of the tangent shape vector x given the observed shape y and model parameters is $$p(x | y, c, s, \theta) = \quad (10)$$
$$\begin{cases} \propto \exp\left\{-\frac{1}{2}[\sigma^{-2}\|x - \mu - \Phi_r b\|^2 + \\ s^2\rho^{-2}\|x - T_\theta^{-1}(y)\|^2]\right\} & \text{when } A^T(x - \mu) = 0 \\ 0, & \text{otherwise} \end{cases}$$

The tangent shape x can be written as $$x=(AA^T+\Phi\Phi^T)x=AA^T\mu+\Phi\Phi^T x=\mu+\Phi\Phi^T x \quad (11)$$

where $A=(e,e^*,\mu,\mu^*)$. Since x is an isotropic Gaussian, the elements of x on the two orthogonal subspaces are independent, i.e. $A^T x \perp \Phi^T x$. So $$p(\Phi^T x \mid A^T(x-\mu)=0) = p(\Phi^T x) \qquad (12)$$
$$= N((1-p)\Phi^T\mu_1 + p\Phi^T\mu_2, \delta^2 I_{2N-4})$$

where $$\mu_1 = \mu + \Phi_r b, \ \mu_2 = T_\theta^{-1}(y), \ p = \sigma^2/(\sigma^2 + s^{-2}\rho^2)$$

and $$\delta^2 = (\sigma^{-2} + s^2\rho^{-2})^{-1}.$$

Therefore the conditional expectation of x is $$\langle x \rangle = AA^T\mu + \Phi E(\Phi^T x) \qquad (13)$$
$$= (1-p)\Phi\Phi^T\mu_1 + p\Phi\Phi^T\mu_2 + AA^T\mu$$
$$= \mu + (1-p)\Phi_r b + p\Phi\Phi^T T_\theta^{-1}(y)$$

and the conditional expectation of the norm of x is $$\langle x^2 \rangle = \|A^T\mu\|^2 + E\|\Phi^T x\|^2 = \|\langle x \rangle\|^2 + (2N-4)\delta^2 \qquad (14)$$

Appendix C

EM for Inhomogeneous Observation Noise

This section presents the results of E-step and M-Step. Let us denote:

$$\Delta \triangleq (\sigma^{-2} + s^2 \Sigma^{-1})^{-1}$$
$$P \triangleq (I + \sigma^2 s^2 \Sigma^{-1})^{-1}$$
$$\alpha \triangleq \Delta^{-1/2}[(P(\mu + \Phi_r b) + (I-P)T_\theta^{-1}(y)]$$

Let $B \triangleq \text{Orth}(\Delta^{1/2}A)$, whose column vectors form an orthogonal basis of the column space of $\Delta^{1/2}A$.

The E-step:

$$\langle x \rangle = \Delta^{1/2}[\alpha + BB^T(\Delta^{-1/2}\mu - \alpha)] \qquad (15)$$
$$\langle x^T \Sigma^{-1} x \rangle = \langle x \rangle^T \Sigma^{-1} \langle x \rangle + \text{tr}(\Delta \Sigma^{-1}) - \text{tr}(\Delta \Sigma^{-1} BB^T). \qquad (16)$$

The M-step:

$$\tilde{b} = \Lambda(\Lambda + \sigma^2)^{-1}\Phi_r^T(\langle x \rangle - \mu) = \Lambda(\Lambda + \sigma^2)^{-1}\Phi_r^T\langle x \rangle \qquad (17)$$

$$\tilde{\gamma} = \left( \frac{y^T \Sigma^{-1}\langle x \rangle}{\langle x^T \Sigma^{-1} x \rangle}, \frac{y^T \Sigma^{-1}\langle x \rangle^*}{\langle x^T \Sigma^{-1} x \rangle}, \frac{\sum_{i=1}^N \rho_i^{-2} y_{1i}}{\sum_{i=1}^N \rho_i^{-2}}, \frac{\sum_{i=1}^N \rho_i^{-2} y_{2i}}{\sum_{i=1}^N \rho_i^{-2}} \right)^T. \qquad (18)$$

The invention claimed is:

1. A method for shape registration comprising:
generating a set of training shape vectors from images in an image database to identify landmark points associated with one or more object types;
describing distribution of shape in a set of training shape vectors as a prior of tangent shape in tangent shape space, transformation differences having been removed from the training shape vectors;
incorporating the prior of tangent shapes into a unified Bayesian framework for shape registration by inferring a likelihood of tangent shape in observed image space to incorporate the prior of tangent shape with image evidence, the tangent shape being associated with the prior of tangent shape, the image evidence having been derived from an observed image.

2. The method of claim 1, wherein the tangent shape space is a linear approximation of a general shape space near a mean shape vector.

3. The method of claim 1, further comprising aligning the training shape vectors in a common coordinate system such that the prior of tangent shape is a transformation-free global model of prior tangent shape.

4. The method of claim 1, wherein incorporating further comprises:
adding a constraining prior to the likelihood, the constraining prior providing a preliminary relationship between object geometrical transformation and shape.

5. The method of claim 1, wherein incorporating further comprises determining a posterior distribution of model parameters in view of an observed image.

6. The method of claim 5, wherein determining the posterior distribution of model parameters in view of an observed image is such that shape parameters indicate specific shape variation along one or more principal component axis, the specific shape variation being configurable as a combination of a number of modes used in multi-dimensional shape space.

7. The method of claim 1, further comprising utilizing an expectation maximization (EM) to update tangent shape and learn maximum a-posteriori (MAP) parameters from a posterior distribution of model parameters determined from the Bayesian framework in view of an observed image.

8. The method of claim 1, further comprising learning at least tangent shape from an observed image via expectation maximization (EM) searching algorithms that implement maximum a-posteriori (MAP) procedures with a derived explicit continuous penalty.

9. The method of claim 1, further comprising updating the tangent shape with a weighted average of shape reconstructed from a shape parameter and a tangent projection of observed shape such that the tangent shape encodes both prior shape knowledge and observed image evidence.

10. The method of claim 1, further comprising updating the tangent shape with a weighted average of shape reconstructed from a shape parameter, a tangent projection of observed shape, and tangent projection of constrained shape in constraint space, the updating being performed such that the tangent shape encodes both prior shape knowledge and observed image evidence.

11. A computer-readable medium storing computer-program instructions for performing operations as recited in the method of claim 1.

12. A computing device comprising a processor coupled to a memory, the memory comprising a computer-program for performing operations as recited in the method of claim 1.

13. A computer-readable medium storing computer-program instructions for shape registration, the computer-program instructions being executable by a processor for:
identifying a prior of shape distribution in a set of training images;

representing the prior of shape distribution in tangent shape space;

incorporating the prior of shape distribution and a likelihood of shape observation in observed image space with a Bayesian Tangent Shape Model (BTSM) and a constraint BTSM (C-BTSM) comprising a constraint model to add additional parameter priors;

wherein similarity-transform coefficients and shape parameters in the BTSM having been determined by maximum a-posteriori (MAP) estimation; and multiplying ratio(s) of observation noise variations to regularize shape parameters, the multiplying operations being continuous and not truncated.

14. The computer readable medium of claim 13, wherein the computer-program instructions are implemented in a face recognition computer-program application.

15. The computer readable medium of claim 13, wherein the computer-program instructions further comprise instructions for:

determining a posterior distribution of BTSM and C-BTSM model parameters in view of an observed image corresponding to the observed image space; and updating tangent shape and learning maximum a-posteriori (MAP) parameters from the posterior distribution to provide an estimation of a particular shape in the observed image.

16. The computer readable medium of claim 15, and wherein the instructions for learning are based on an expectation maximization (EM) with simplified parameterization of maximum a-posteriori (MAP) operations.

17. The computer readable medium of claim 15, and wherein the instructions for learning further comprise instructions for updating the tangent shape with a weighted average of shape reconstructed from a shape parameter and a tangent projection of observed shape such that the tangent shape encodes both prior shape knowledge and observed image evidence.

18. The computer readable medium of claim 15, and wherein the instructions for learning further comprise instructions for updating the tangent shape with a weighted average of shape reconstructed from a shape parameter, a tangent projection of observed shape, and tangent projection of constrained shape in constraint space, the updating being performed such that the tangent shape encodes both prior shape knowledge and observed image evidence.

19. A computing device for shape registration, the computing device comprising a processor coupled to a memory, the memory comprising computer-program instructions executable by the processor for:

describing distribution of shape in a set of training shape vectors as a prior of tangent shape in tangent shape space, transformation differences having been removed from the training shape vectors, the training shape vectors having been generated from images in an image database to identify landmark points associated with one or more object types;

inferring a likelihood of tangent shape in observed image space to incorporate the prior of tangent shape with image evidence, the tangent shape being associated with the prior of tangent shape, the image evidence having been derived from an observed image;

adding a constraining prior to the likelihood, the constraining prior providing a preliminary relationship between object geometrical transformation and shape;

determining a posterior distribution of model parameters in view of the observed image; and utilizing an expectation maximization (EM) to update the tangent shape and learn MAP parameters from the posterior distribution of model parameters.

* * * * *